United States Patent
Tian et al.

(10) Patent No.: US 11,739,603 B2
(45) Date of Patent: Aug. 29, 2023

(54) CORE DETECTION DEVICE OF CORING INSTRUMENT

(71) Applicants: China National Offshore Oil Corporation, Beijing (CN); China Oilfield Services Limited, Tianjin (CN)

(72) Inventors: Zhibin Tian, Hebei (CN); Lin Huang, Hebei (CN); Zanqing Wei, Hebei (CN); Shusheng Guo, Hebei (CN); Yongren Feng, Hebei (CN); Xingfang Wu, Hebei (CN); Tiemin Liu, Hebei (CN); Yong Jiang, Hebei (CN); Bin Gao, Hebei (CN); Peng Sun, Hebei (CN); Shiwei Zong, Hebei (CN); Jianyong Zhang, Hebei (CN); Aijun Zhang, Hebei (CN)

(73) Assignees: China National Offshore Oil Corporation, Beijing (CN); China Oilfield Services Limited, Tianjin (CN)

( * ) Notice: Subject to any disclaimer, the term of this patent is extended or adjusted under 35 U.S.C. 154(b) by 86 days.

(21) Appl. No.: 17/178,479

(22) Filed: Feb. 18, 2021

(65) Prior Publication Data
US 2021/0285849 A1    Sep. 16, 2021

(30) Foreign Application Priority Data
Mar. 12, 2020  (CN) .......................... 202010171021.5

(51) Int. Cl.
*G01N 1/08*    (2006.01)
*G01B 21/02*   (2006.01)
(Continued)

(52) U.S. Cl.
CPC .......... *E21B 25/00* (2013.01); *E21B 17/1021* (2013.01); *G01B 21/02* (2013.01); *G01N 1/08* (2013.01)

(58) Field of Classification Search
CPC .......... E21B 10/02; E21B 10/04; E21B 10/06; E21B 17/1021; E21B 48/06; E21B 25/00; G01B 5/043; G01B 21/02; G01N 1/08
See application file for complete search history.

(56) References Cited

U.S. PATENT DOCUMENTS

| | | | | |
|---|---|---|---|---|
| 473,910 A | * | 5/1892 | Bullock ................. | E21B 10/04 175/246 |
| 2,038,791 A | * | 4/1936 | Howard ................. | E21B 25/00 175/239 |

(Continued)

*Primary Examiner* — Nicole Coy
*Assistant Examiner* — Nicholas D Wlodarski
(74) *Attorney, Agent, or Firm* — Banner & Witcoff, Ltd.

(57) ABSTRACT

A core detection device of a coring instrument includes a base body and a core switch mechanism provided on the base body. The base body is provided with a core channel communicated with a core barrel. The core switch mechanism includes a detection portion, a connecting rod assembly and a travel switch which are sequentially arranged and connected along a length direction of the coring instrument. The detection portion is rotatably installed on the base body and one end thereof is extended into the core channel, so that a core passing through the core channel pushes the detection portion to rotate. The connecting rod assembly can be pulled by the rotating detection portion to trigger the travel switch to operate. The core switch mechanism adopts a slider-connecting rod structure, and the kinematic pairs are mainly a sliding pair and a rotating pair.

16 Claims, 4 Drawing Sheets

(51) Int. Cl.
*E21B 25/00* (2006.01)
*E21B 17/10* (2006.01)

(56) References Cited

U.S. PATENT DOCUMENTS

| | | | | |
|---|---|---|---|---|
| 3,565,192 | A * | 2/1971 | McLarty | E21B 10/32 175/246 |
| 4,714,119 | A * | 12/1987 | Hebert | E21B 49/06 175/58 |
| 5,667,025 | A * | 9/1997 | Haessly | E21B 49/06 175/78 |
| 10,378,347 | B2 * | 8/2019 | Massey | E21B 49/06 |
| 2011/0247881 | A1 * | 10/2011 | Orban | E21B 25/00 175/244 |
| 2012/0012393 | A1 * | 1/2012 | Kumar | E21B 25/00 175/58 |
| 2013/0105227 | A1 * | 5/2013 | Drenth | E21B 25/02 175/246 |
| 2015/0068812 | A1 * | 3/2015 | Wesemeier | E21B 25/10 175/244 |
| 2016/0053564 | A1 * | 2/2016 | Haley | E21B 4/006 175/50 |
| 2017/0159429 | A1 * | 6/2017 | Massey | E21B 49/06 |
| 2018/0148988 | A1 * | 5/2018 | Dusterhoft | E21B 25/02 |

\* cited by examiner

CORE DETECTION DEVICE OF CORING INSTRUMENT

CROSS-REFERENCE TO RELATED APPLICATION

This application claims the priority to Chinese patent application No. 202010171021.5 filed on Mar. 12, 2020, the entirety of which is hereby incorporated by reference.

TECHNICAL FIELD

The disclosure relates to the field of petroleum exploration and development, in particular to a core detection device of a coring instrument.

BACKGROUND

In the process of coring with cables, the accurate detection of the success of coring in real time and measurement of the quality of the retrieved core underground are very important for improving coring efficiency and coring quality. In addition, it is also crucial for geological analysis to accurately determine the horizon of the required core. At present, the number of cores retrieved by a coring instrument at one time can be as high as 80, which is difficult to return to the coring position, especially in a fragile fractured formation. Therefore, a core detection device is provided in the coring instrument, which can monitor whether the coring is successful in real time, measure the length of core and judge whether its quality meets the standard. If the purpose of coring is not achieved, the depth can be immediately relocated and a re-coring is performed. The core detection device includes a core switch provided at an entrance of a core storage barrel, but the existing core switch is complex in structure and is prone to be stuck in the actual on-site application process, which makes it incapable of accurately detecting the core, and it occupies a large space in the radial direction of the instrument.

SUMMARY

An embodiment of the disclosure provides a core detection device of a coring instrument, including a base body and a core switch mechanism provided on the base body. The base body is provided with a core channel in communication with a core barrel. The core switch mechanism includes a detection portion, a connecting rod assembly and a travel switch which are sequentially arranged and connected along a length direction of the coring instrument. The detection portion is rotatably installed on the base body and one end thereof is extended into the core channel, so that a core passing through the core channel pushes the detection portion to rotate. The connecting rod assembly can be pulled by the rotating detection portion to trigger the travel switch to operate.

Other features and advantages of the disclosure will be set forth in the description which follows, and in part will be obvious from the description, or may be learned by implementation of the disclosure. The objects and other advantages of the disclosure can be realized and obtained by structures particularly indicated in the description and the accompanying drawings.

BRIEF DESCRIPTION OF DRAWINGS

The accompanying drawings are used to provide a further understanding of technical solutions of the disclosure, and constitute a part of the specification, which are used together with the embodiments of the present application to explain the technical solutions of the disclosure, and do not constitute a restriction on the technical solutions of the disclosure.

Reference signs: 100—protective outer barrel, 200—core barrel, 300—spacer barrel, 301—compression spring, 302—spacer, 400—base body, 401—core channel, 402—main body, 403—partition plate, 404—installation cavity, 405—sliding cavity, 406—communication channel, 407—spacer channel, 408—connecting post, 409—guide rib, 410—chute, 411—gap, 500—core switch mechanism, 501—detection portion, 502—connecting rod assembly, 503—travel switch, 504—elastic member, 505—pull rod, 506—connector, 507—first housing, 508—guide base, 509—insulating sleeve, 510—copper screw, 511—pressing sleeve, 512—first sealing loop, 513—first retaining ring, 514—first end cap, 515—first shell, 516—lower joint, 517—first rotating shaft, 518—fourth rotating shaft, 519—fifth rotating shaft, 520—first sealing ring, 521—second sealing ring, 522—first guide post, 523—connecting rod, 600—spacer insertion mechanism, 601—slider, 602—rotating arm, 603—cylinder body, 604—second housing, 605—second guide post, 606—connecting base, 607—second end cap, 608—second shell, 609—plug, 610—adjusting screw, 611—second sealing loop, 612—second retaining ring, 613—third sealing ring, 614—fourth sealing ring, 615—bracket, 616—receiving notch, 617—third rotating shaft, 618—second elongated hole, 619—first elongated hole, 620—second rotating shaft, 621—sixth rotating shaft, 622—guide groove, 623—slider body, 624—arc surface, 700—displacement detector, 801—core pushing piston rod, 802—core pushing head, 900—coring bit, 1000—controller.

DETAILED DESCRIPTION

In order to make the objects, technical solutions and advantages of the disclosure clearer, embodiments of the disclosure will be described in detail with reference to the accompanying drawings. It should be noted that the embodiments in the present application and the features in the embodiments can be arbitrarily combined with each other if there is no conflict.

Figure 1:
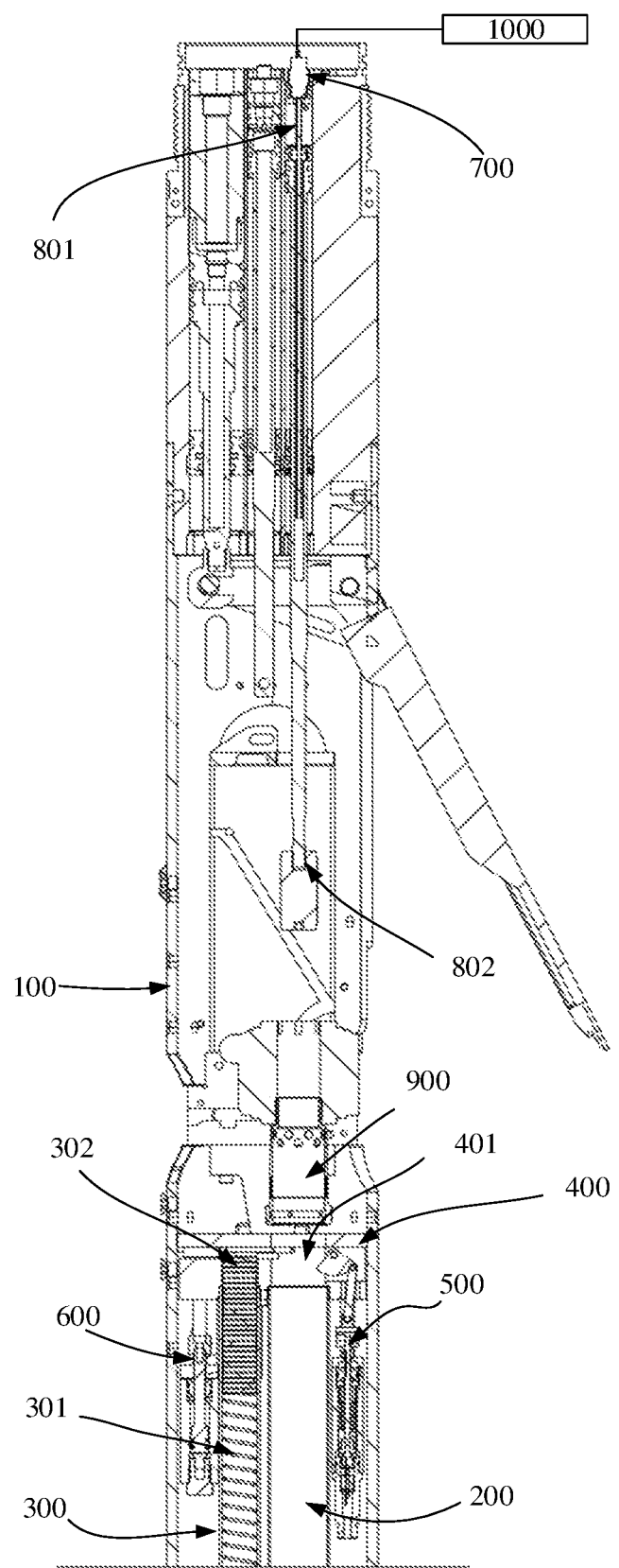
FIG. 1 is a schematic diagram of a coring instrument according to an embodiment of the disclosure.
Figure 2:
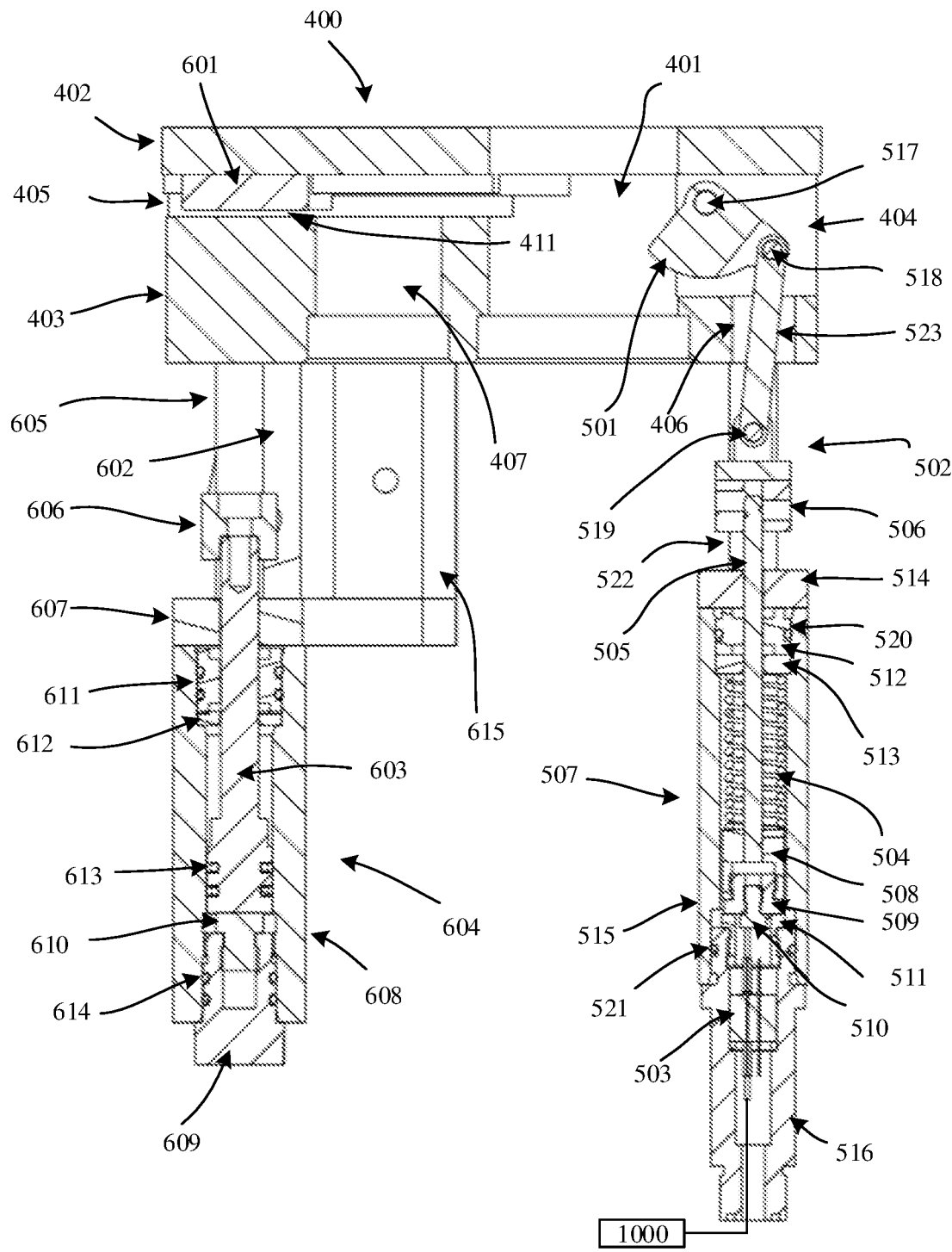
FIG. 2 is a sectional view of the core detection device in FIG. 1.

Referring to FIGS. 1 to 6, a core detection device of a coring instrument according to the disclosure is shown. As shown in FIG. 1 and FIG. 2, the core detection device is placed in a protective outer barrel 100, which can protect various components in the core detection device from impact. The core detection device includes a base body 400 and a core switch mechanism 500 provided on the base body, and the base body 400 is provided with a core channel 401 in communication with a core barrel 200, so that a core retrieved by drilling needs to be pushed into the core barrel 200 after passing through the core channel 401. The core switch mechanism 500 includes a detection portion 501, a connecting rod assembly 502 and a travel switch 503 which are sequentially arranged and connected along a length direction of the coring instrument. The detection portion 501 is rotatably installed on the base body 400 and one end thereof is extended into the core channel 401, so that the core passing through the core channel 401 can push the detection portion to rotate. Meanwhile, the connecting rod assembly 502 can be pulled by the rotating detection portion 501 to trigger the travel switch 503 to operate, thereby realizing real-time core detection. Therefore, the core switch mechanism of this embodiment adopts a connecting rod structure, and the kinematic pairs are mainly a sliding pair and a rotating pair. The structure is simpler and more reliable, and the adaptability to the high-temperature mud environment underground is stronger. Moreover, since the core switch mechanism is provided along the length direction of the coring instrument, the radial size and occupied space thereof can be reduced.

Figure 3:
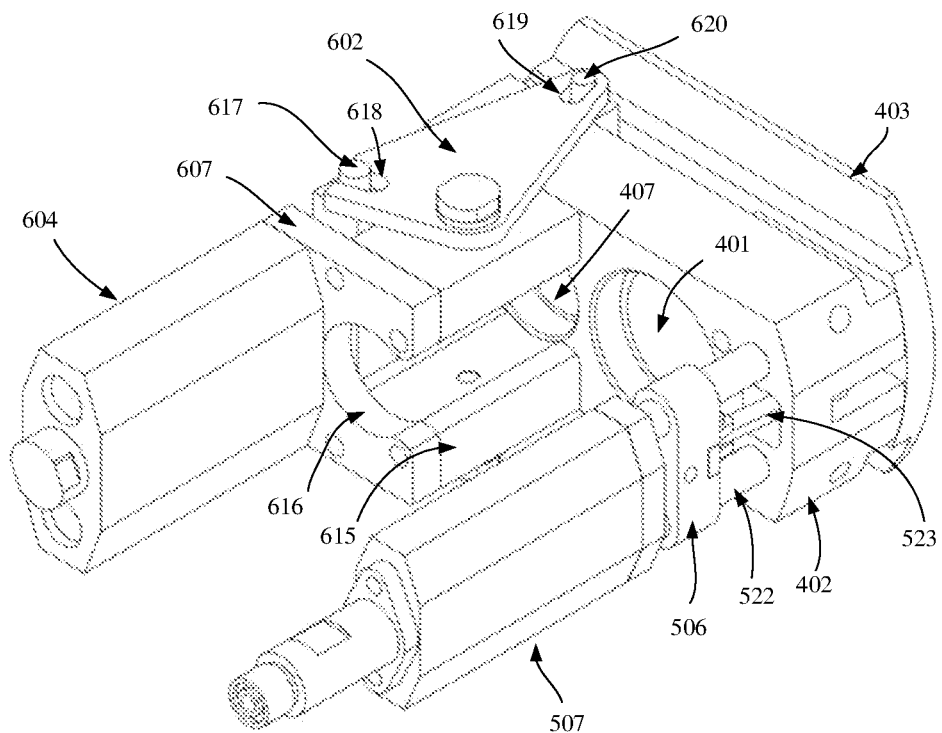
FIG. 3 is a first schematic diagram of the core detection device in FIG. 1.

Specifically, as shown in FIGS. 1 to 3, the coring instrument further includes a core pushing rod configured to push cores and a core barrel 200 configured to store cores. An open end of the core barrel 200 is fixed on the base body 400 and is in communication with the core channel 401. The core pushing rod further includes a core pushing piston rod 801 and a core pushing head 802 which are connected with each other. The core pushing rod is coaxially provided with the core barrel 200 and can push the cores in the coring bit 900 into the core barrel 200 through the core channel 401.

As shown in FIG. 2 and FIG. 3, the core switch mechanism 500 further includes a first housing 507. The travel switch 503 is provided in the first housing 507. One end of the connecting rod assembly 502 needs to extend into the first housing 507, and the other end of the connecting rod assembly is connected with the detection portion 501, so that the connecting rod assembly 502 can slide along a length direction of the first housing 507. Further, the first housing 507 is spaced apart from the base body 400 and connected with the base body 400 by two first guide posts 522, which forms a stable fixation between the first housing 507 and the base body 400. Both the first housing 507 and the first guide posts 522 are arranged along the length direction of the coring instrument. The first housing 507 includes a first end cap 514, a first shell 515 and a lower joint 516 which are connected. Both ends in the length direction of the first shell 515 are open. The first end cap 514 and the lower joint 516 respectively block the two openings of the first shell 515 to form a closed space. The first guide posts 522 are fixed to the first end cap 514, and a cable of the travel switch 503 may be led out via the lower joint 516. The travel switch 503 of this embodiment may be a contact switch, a probe is provided thereon and faces the connecting rod assembly 502. Alternatively, the travel switch may be a proximity switch or the like. In order to ensure the sealing of the first housing 507, a first seal is provided at a junction between the first end cap 514 and the first shell 515, the first seal includes a first sealing loop 512 and a first retaining ring 513. The first retaining ring 513 may cooperate with a stepped surface of an inner wall of the first shell 515 to limit the first sealing loop 512. The pull rod 505 penetrates through the first sealing loop 512 and the first retaining ring 513. A first sealing ring 520 is provided between the first sealing loop 512 and the first shell 515, and a second sealing ring 521 is provided at a junction between the lower joint 516 and the first shell 515.

As shown in FIG. 2, the base body 400 is provided with an installation cavity 404, the installation cavity 404 is in communication with the core channel 401. The sector-shaped detection portion 501 is installed in the installation cavity 404 through a first rotating shaft 517. In an initial state, one end of the detection portion 501 extends into the core channel 401, which may interfere with the travel of the core passing through the core channel 401, thus the core passing through the core channel 401 may push the detection portion 501 to rotate counterclockwise. The other end of the detection portion 501 is hinged with the connecting rod assembly 502 through a fourth rotating shaft 518, so that the counterclockwise rotating detection portion 501 may pull the connecting rod assembly 502 away from the travel switch 503.

For the connecting rod assembly 502, as shown in FIG. 2 and FIG. 3, the connecting rod assembly 502 includes a connecting rod 523 and a pull rod 505. Two ends of the connecting rod 523 are respectively hinged with the detection portion 501 and the pull rod 505 through the fourth rotating shaft 518 and a fifth rotating shaft 519. The pull rod 505 extends in the length direction of the coring instrument (i.e., parallel to the axial direction of the core barrel 200) and one end thereof is extended into the first housing 507. The base body 400 is provided with a communication channel 406 in communication with the installation cavity 404, so that the connecting rod 523 connected with the detection portion 501 may extend out of the installation cavity 404. The one end of the pull rod 505 extending into the first housing 507 is connected with a guide base 508, and the size of the guide base 508 is matched with the internal profile of the first shell 515, so that the pull rod 505 may slide along the length direction of the first housing 507. In order to enable the connecting rod assembly 502 to trigger the travel switch 503, the guide base 508 is provided with an insulating sleeve 509 on a side facing the travel switch 503, and a copper screw 510 is provided on the insulating sleeve 509. When the core switch mechanism 500 is in the initial state, the copper screw 510 contacts the probe on the travel switch 503 to operate the travel switch 503.

An elastic member 504 is provided at one end of the connecting rod assembly 502 connected with the travel switch 503. After the core passes through the core channel 401, the elastic member 504 may apply a force to the pulled connecting rod assembly 502 to reset it. The elastic member 504 is a spring. As shown in FIG. 2, the spring is sleeved on the pull rod 505 and located between the first seal and the guide base 508. When the detection portion 501 pulls the connecting rod assembly 502 away from the travel switch 503, the guide base 508 will press the elastic member 504. When the core pushing is absent, the elastic member 504 may push the guide base 508 to move towards the travel switch 503, thus resetting the connecting rod assembly 502. In order to limit the travel position of the guide base 508 close to the travel switch 503, a pressing sleeve 511 is provided in the first housing 507. The travel switch 503 is positioned on the lower joint 516, and the pressing sleeve 511 abuts against an end face of the lower joint 516. The inner wall of the first shell 515 is formed with another stepped surface to prevent the pressing sleeve 511 from further moving away from the lower joint 516. In the initial state, the insulating sleeve 509 is pressed against the pressing sleeve 511 to prevent the pull rod 505 from further moving towards the travel switch 503.

In addition, as shown in FIG. 2 and FIG. 3, the pull rod 505 is connected with the connecting rod 523 through a connector 506. The connector 506 is fixed at one end of the pull rod 505 and located outside the first housing 507, and the connector 506 is hinged with the connecting rod 523 through the fifth rotating shaft 519. In addition, the connector 506 is further respectively sleeved on the first guide posts 522, forming a sliding connection between the connector 506 and the first guide posts 522, and further guiding the pull rod 505, so that the core switch mechanism 500 forms a slider-connecting rod structure, which can further improve the operation reliability of the core switch mechanism 500.

Further as shown in FIG. 1 and FIG. 2, the core detection device further includes a displacement detector 700 and a controller 1000. The displacement detector 700 is provided on the core pushing rod and may detect a moving distance of the core pushing rod, and the controller 1000 is electrically connected with the displacement detector 700 and the travel switch 503 respectively. Therefore, when the core pushing rod pushes the core into the core channel 401 to contact and push the detection portion 501, the travel switch 503 operates and transmits a core acquisition signal to the controller 1000. The controller 1000 acquires data of the displacement detector 700 at this moment and detects that the instrument has acquired a core. When the core passes through the detection portion 501, the elastic member 504 resets the core switch mechanism 500, and the travel switch 503 operates again and transmits a no-core signal to the controller 1000. The controller 1000 acquires data b of the displacement detector 700 at this moment, and obtains the length of the acquired core from a difference value between the data b and the data a.

As shown in FIG. 1, the core detection device further includes a spacer insertion mechanism 600. After every operation of pushing the core, the spacer insertion mechanism 600 pushes a spacer 302 to the core channel 401, and the spacer 302 may physically distinguish cores of different horizons. The spacer insertion mechanism 600 and a spacer barrel 300 are both fixed to the base body 400. The spacer barrel 300 is provided therein with multiple spacers 302, and a compression spring 301 is also provided in the spacer barrel. The compression spring 301 may press the spacers 302 to make them close to the base body 400. Further, as shown in FIG. 2, the base body 400 is provided with a sliding cavity 405 in communication with the core channel 401 and a spacer channel 407 in communication with the spacer barrel 300. The spacer channel 407 extends to the sliding cavity 405, so that the spacer 302 may be pushed to the sliding cavity 405 under the action of the compression spring 301, and further enters the core channel 401 along the sliding cavity 405 under the pushing action of the spacer insertion mechanism 600.

Figure 4:
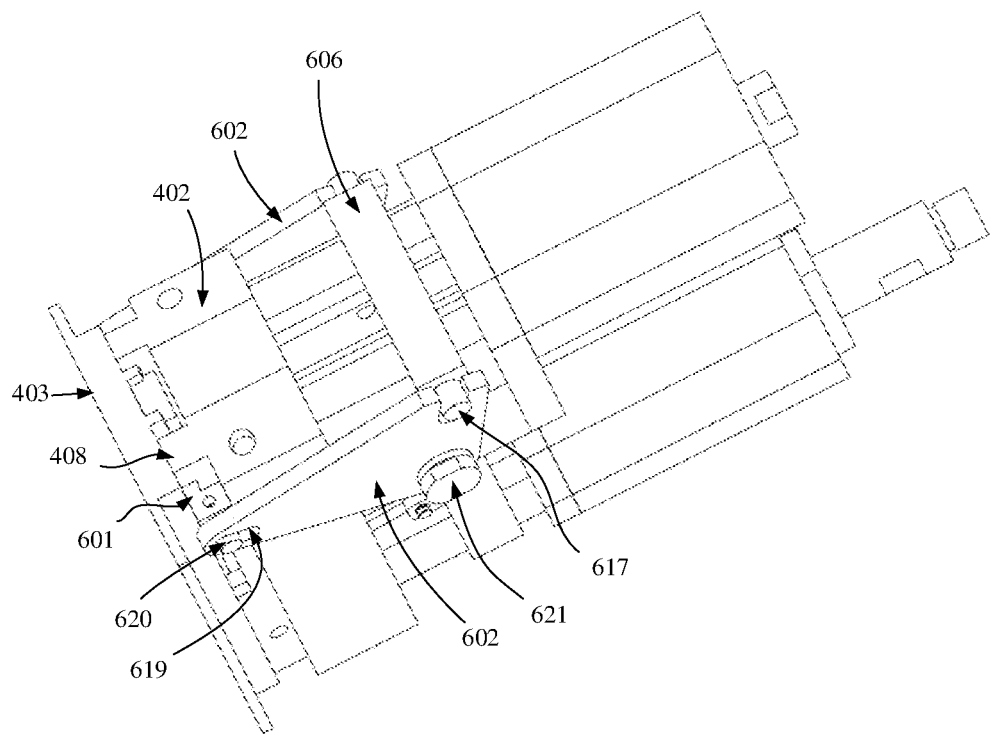
FIG. 4 is a second schematic diagram of the core detection device in FIG. 1.

As shown in FIG. 1, FIG. 2 and FIG. 4, the spacer insertion mechanism 600 is fixed on the base body 400 and arranged along the length direction of the coring instrument, which can further reduce the radial size and occupied space of the instrument. The spacer insertion mechanism 600 includes a slider 601, a rotating arm 602, a second housing 604 and a cylinder body 603. The second housing 604 is fixed to the base body 400. The cylinder body 603 is a hydraulic cylinder which is provided in the second housing 604 and a piston rod thereof serving as an output end is connected with the slider 601 through the rotating arm 602. The slider 601 slides in the sliding cavity 405, so that the slider 601 may be driven by the cylinder body 603 to push the spacer 302 to the core channel 401.

As shown in FIG. 2, the second housing 604 includes a second end cap 607, a second shell 608 and a plug 609. Both ends in the length direction of the second shell 608 are open. The second end cap 607 and the plug 609 respectively block the two openings of the second shell 608 to form another closed space. The cylinder body 603 is provided in the second shell 608 and the output end thereof extends out of the second housing 604 via the second end cap 607. As shown in FIG. 3, the second end cap 607 is fixed on the base body 400 by two brackets 615, which are spaced apart to form a space therebetween for installing the spacer barrel. In addition, in order to receive the spacer barrel, the second end cap 607 is further provided with a receiving notch 616. The plug 609 is provided with an adjusting screw 610 for adjusting the position of the cylinder body 603 to ensure that the slider 601 is pushed in place. In addition, second guide posts 605 are further provided between the second end cap 607 and the base body 400, and two ends of each of the two second guide posts 605 are respectively connected with the second end cap 607 and the base body 400. The output end of the cylinder body 603 is provided with a connecting base 606. The connecting base 606 is sleeved on the two second guide posts 605 to form a sliding connection, which may guide the connecting base 606. In order to ensure the sealing of the second housing 604, a second seal is provided at a junction between the second end cap 607 and the second shell 608, the second seal includes a second sealing loop 611 and a second retaining ring 612. The second retaining ring 612 may cooperate with a stepped surface on the inner wall of the second shell 608 to limit the second sealing loop 611. The output end of the cylinder body 603 penetrates through the second sealing loop 611 and the second retaining ring 612. A third sealing ring 613 is provided between the cylinder body 603 and the inner wall of the second shell 608, and a fourth sealing ring 614 is provided at a junction between the plug 609 and the second shell 608.

As shown in FIGS. 2 to 4, a rotating arm 602 is rotatably installed on each of the two brackets 615 through a sixth rotating shaft 621, and the two rotating arms 602 which are triangular-shaped are located at both sides of the base body 400 and separated by the base body 400. The connecting base 606 is hinged with the rotating arms 602 at both ends thereof. Any one of the rotating arms 602 is correspondingly provided with a second elongated hole 618 at a sharp corner thereof, and the second elongated hole 618 extends to an edge of the rotating arm 602 to form a notch. Two ends of the connecting base 606 are each provided with a third rotating shaft 617. The third rotating shaft 617 is inserted into the respective second elongated hole 618 to form a hinged connection between the connecting base 606 and the respective rotating arm 602. The slider 601 spans across the base body 400, and both ends of the slider 601 are respectively hinged with two rotating arms 602. Any one of the rotating arms 602 is correspondingly provided with a first elongated hole 619 at the other sharp corner thereof. Both ends of the slider 601 are each provided with a second rotating shaft 620. The second rotating shaft 620 is inserted into the respective first elongated hole 619 to form a hinged connection between the slider 601 and the respective rotating arm 602. Therefore, the spacer insertion mechanism 600 forms a slider pushing structure. When the output end of the cylinder body 603 drives the connecting base 606 to move along the second guide posts 605, it will drive the rotating arms 602 to rotate, and the rotating arms 602 will pull the slider 601 to slide in the sliding cavity 405. For example, when the cylinder body 603 pushes the connecting base 606 away from the second housing 604, the rotation of the rotating arms 602 will pull the slider 601 to move toward the core channel 401, and when the cylinder body 603 moves in reverse, the slider 601 may be pulled back again.

Figure 5:
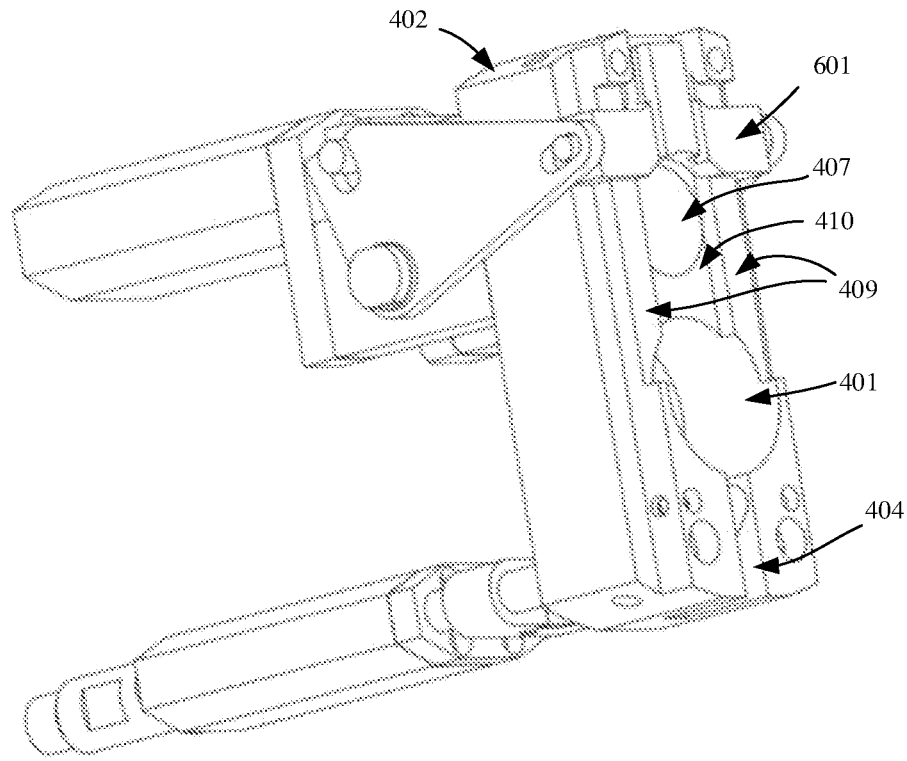
FIG. 5 is a schematic diagram of the main body in FIG. 1.

As shown in FIG. 1 and FIG. 2, the base body 400 includes a main body 402 and a partition plate 403 which are separate. The partition plate 403 is provided on a side of the main body 402 facing away from the core barrel 200, and the sliding cavity 405 is formed between the main body 402 and the partition plate 403. As shown in FIG. 5, the main body 402 is provided with two protruding and spaced guide ribs 409 on an end face facing the partition plate 403 for guiding the slider 601. The two guide ribs 409 extend to the core channel 401, and a chute 410 is formed between the two guide ribs 409 for sliding the spacer 302. During the sliding process, the end face of the slider 601 opposite to the partition plate 403 abuts against the partition plate 403 and slides on the partition plate 403. The main body 402 is further provided with a connecting post 408 protruding from the guide rib 409, the connecting post 408 is connected with the partition plate 403 and is able to support the partition plate 403, so that a space slightly larger than the thickness of a single spacer is formed between the partition plate 403 and the bottom of the chute 410.

Figure 6:
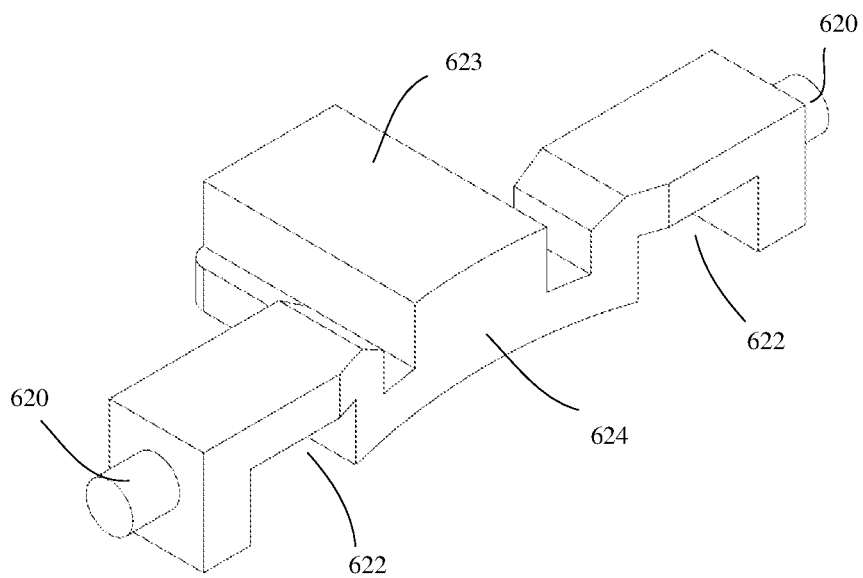
FIG. 6 is a schematic diagram of the slider in FIG. 1.

As shown in FIG. 5 and FIG. 6, the cross section of the slider 601 is M-shaped, which includes a slider body 623 and guide grooves 622 provided on both sides of the slider body, and the second rotating shaft 620 is further provided outside each guide groove 622. The guide grooves 622 are matched with the guide ribs 409, so that the guide grooves 622 may be snapped on the guide ribs 409 to form a sliding connection. The slider body 623 extends into the chute 410 and is spaced apart from the bottom of the chute 410 to form a gap 411 between the bottom of the slider body 623 and the bottom of the chute 410. The gap 411 in this embodiment is set to 1 mm, so that the slider 601 may squeeze out sludge by the gap 411 during sliding, thus avoiding jamming. In addition, an end face of the slider 601 facing the spacer 302 is provided with an arc surface 624 corresponding to the spacer 302, so that the slider 601 is in surface contact with the spacer 302, which can further improve the stability of pushing.

The cylinder body 603 is also electrically connected with the controller 1000 (not shown in the figures). When the spacers 302 are adequate, the spacers 302 will be pushed to the sliding cavity 405 under the action of the compression spring 301 and abut against the partition plate 403. In this case, after each operation of core pushing is completed, the controller 1000 will control the cylinder body 603 of the spacer insertion mechanism 600 to activate, and the slider 601 will push the spacer 302 in place and push one of the spacers 302 to the core channel 401, thereby completing the insertion of the spacer 302.

Combined with the above embodiments, the core switch mechanism of the embodiments of the disclosure adopts a slider-connecting rod structure, and the kinematic pairs are mainly a sliding pair and a rotating pair. The structure is simpler and more reliable, and the adaptability to the high-temperature mud environment underground is stronger. Moreover, since the core switch mechanism is provided along the length direction of the coring instrument, the radial size and occupied space thereof can be reduced. According to the embodiments of the disclosure, the spacer insertion mechanism is changed from the existing swing hydraulic cylinder structure to the slider pushing structure, and the kinematic pairs are mainly a sliding pair and a rotating pair, thereby completely avoiding jamming and greatly improving the reliability.

According to a possible design, the connecting rod assembly is provided with an elastic member at one end thereof connected with the travel switch, so as to reset the connecting rod assembly after the core passes through the core channel to trigger the travel switch.

According to a possible design, the core detection device includes a spacer insertion mechanism fixed on the base body, the spacer insertion mechanism includes a slider and a cylinder body, an output end of the cylinder body is connected with the slider, and the slider is slidably connected with the base body to push a spacer to the core channel.

According to a possible design, the core switch mechanism further includes a first housing connected with the base body, the connecting rod assembly includes a connecting rod and a pull rod, two ends of the connecting rod are respectively hinged with the detection portion and the pull rod, one end of the pull rod away from the connecting rod extends into the first housing, and the travel switch is provided in the first housing at an end far away from the pull rod.

According to a possible design, the first housing is connected with the base body through a first guide post, the pull rod is hinged with the connecting rod through a connector provided at one end of the pull rod, and the connector is slidably connected with the first guide post to guide the pull rod.

According to a possible design, the other end of the pull rod is provided with a guide base which is configured to slide in the first housing, the elastic member is a spring provided in the first housing, and the spring is sleeved on the pull rod.

According to a possible design, an insulating sleeve is provided on a side of the guide base facing the travel switch, and a copper screw configured to trigger the travel switch is provided on the insulating sleeve.

According to a possible design, the first housing includes a first end cap, a first shell and a lower joint which are sequentially connected; the first end cap is provided with the first guide post extending to the base body, a first seal corresponding to the first end cap is sleeved on a portion of the pull rod in the first housing; and the elastic member is provided between the first seal and the guide base.

According to a possible design, a pressing sleeve is provided in the first housing; the pressing sleeve is fixedly provided between the guide base and the travel switch, and the pressing sleeve abuts against the insulating sleeve to limit the guide base.

According to a possible design, the base body is provided with an installation cavity in communication with the core channel, and the detection portion is installed in the installation cavity through a first rotating shaft.

According to a possible design, the spacer insertion mechanism includes a rotating arm, the cylinder body is fixed to the base body, and the output end of the cylinder body is connected with the slider through the rotating arm to drive the slider to slide.

According to a possible design, the base body includes a main body and a partition plate which are connected, and a sliding cavity for the slider to slide therein is formed between the main body and the partition plate. The slider abuts against the partition plate. The main body is provided with two guide ribs for sliding and guiding the slider, a chute for sliding the spacer is formed between the two guide ribs, the slider is slidable on the guide ribs, and a gap is provided between the slider and the bottom of the chute.

According to a possible design, the spacer insertion mechanism includes a second housing fixed to the base body through a bracket, the rotating arm is rotatably installed on the bracket and is respectively hinged with the slider and the output end of the cylinder body, and the cylinder body is provided in the second housing and the output end thereof extends out of the second housing.

According to a possible design, the slider spans across the base body, two rotating arms are respectively provided at two sides of the base body, and each rotating arm and the slider are respectively provided with a first elongated hole and a second rotating shaft for hinged connection.

According to a possible design, a second guide post is provided between the second housing and the base body, a connecting base is provided at the output end of the cylinder body, the connecting base is in sliding connection with the second guide post, and the rotating arm and the connecting base are respectively provided with a second elongated hole and a third rotating shaft for hinged connection.

According to a possible design, the second housing includes a second end cap, a second shell and a plug which are sequentially connected, the output end of the cylinder body extends out of the second housing through the second end cap, and a second seal corresponding to the second end cap is provided in the second shell.

According to a possible design, the cross section of the slider is M-shaped, the slider includes guide grooves corresponding to the guide ribs, and an end face of the slider facing the spacer is provided with an arc surface corresponding to the spacer.

According to a possible design, the core detection device includes a core pushing rod, a displacement detector and a controller. The controller is electrically connected with the displacement detector and the travel switch respectively, the displacement detector is provided on the core pushing rod, and the controller calculates a core length according to a displacement data of the core pushing rod obtained by the displacement detector during operation of the travel switch.

According to the embodiments of the disclosure, the core switch mechanism adopts a slider-connecting rod structure, and the kinematic pairs are mainly a sliding pair and a rotating pair. The structure is simpler and more reliable, and the adaptability to the high-temperature mud environment underground is stronger. Moreover, since the core switch mechanism is provided along the length direction of the coring instrument, the radial size and occupied space thereof can be reduced.

According to the embodiments of the disclosure, the spacer insertion mechanism is changed from the existing swing hydraulic cylinder structure to the slider pushing structure, and the kinematic pairs are mainly a sliding pair and a rotating pair, thereby completely avoiding jamming and greatly improving the reliability.

In the description of the present disclosure, it should be noted that the orientation or positional relations indicated by terms such as "upper", "lower", "one side", "the other side", "one end", "the other end", "side", "opposite", "four corners", "periphery", "block-shaped structure" are based on orientation or positional relations shown in the drawings, which are only for facilitating describing the present disclosure and simplifying the description, and do not indicate or imply that the referred structure must have a specific orientation, or be constructed and operated in a specific orientation. Therefore, they cannot be construed as limitations on the present disclosure.

In the description of embodiments of the present disclosure, unless otherwise explicitly specified and limited, the terms "connection", "direct connection", "indirect connection", "fixed connection", "installation" and "assembly" should be broadly understood. For example, a connection may be fixed connection, detachable connection or integrated connection. The terms "installation", "connection" and "fixed connection" may refer to direct connection, or indirect connection through an intermediate medium, or internal communication of two elements. For those of ordinary skills in the art, the specific meanings of the above terms in the present disclosure may be understood according to specific situations.

While the embodiments disclosed in the invention are as above, the foregoing contents merely are embodiments employed for easy to understanding the disclosure, and are not intended to limit the disclosure. Without departing from the spirit and scope of the disclosure, any person skilled in the field of the invention can make any modifications and changes in the implementation form and details, but the protection scope of patent of the disclosure shall still be subject to the definition of the appended claims.

What is claimed is:

1. A core detection device of a coring instrument, comprising: a base body and a core switch mechanism provided on the base body, the base body being provided with a core channel in communication with a core barrel,
wherein the core switch mechanism comprises a detection portion, a connecting rod assembly and a travel switch which are sequentially arranged and connected along a length direction of the coring instrument; the detection portion is rotatably installed on the base body and one end thereof is extended into the core channel, so that a core passing through the core channel pushes the detection portion to rotate, and the connecting rod assembly is capable of being pulled by the rotating detection portion to trigger the travel switch to operate;
wherein an elastic member is provided at one end of the connecting rod assembly connected with the travel switch and configured to reset the connecting rod assembly after the core passes through the core channel, so as to trigger the travel switch;
wherein the core switch mechanism further comprises a first housing connected with the base body, the connecting rod assembly comprises a connecting rod and a pull rod, two ends of the connecting rod are respectively hinged with the detection portion and the pull rod, one end of the pull rod away from the connecting rod extends into the first housing, and the travel switch is provided in the first housing at one end away from the pull rod;
wherein the first housing is connected with the base body through a first guide post, and the pull rod is hinged with the connecting rod through a connector provided at one end of the pull rod, and the connector is slidably connected with the first guide post for guiding the pull rod.

2. The core detection device of the coring instrument according to claim 1, comprising a spacer insertion mechanism fixed on the base body, wherein the spacer insertion mechanism comprises a slider and a cylinder body, an output end of the cylinder body is connected with the slider, and the slider is slidably connected with the base body to push a spacer to the core channel.

3. The core detection device of the coring instrument according to claim 2, wherein the spacer insertion mechanism comprises a rotating arm, the cylinder body is fixed to the base body, and an output end of the cylinder body is connected with the slider through the rotating arm to drive the slider to slide.

4. The core detection device of the coring instrument according to claim 3, wherein the base body comprises a main body and a partition plate which are connected with each other, and a sliding cavity for the slider to slide therein is formed between the main body and the partition plate; the slider abuts against the partition plate; the main body is provided with two guide ribs configured to guide the sliding of the slider, a chute for the spacer to slide therein is formed between the two guide ribs, the slider is slidable on the guide ribs, and a gap is provided between the slider and a bottom of the chute.

5. The core detection device of the coring instrument according to claim 4, wherein the slider has an M-shaped cross section and comprises guide grooves corresponding to the guide ribs, and an end face of the slider facing the spacer is provided with an arc surface corresponding to the spacer.

6. The core detection device of the coring instrument according to claim 3, wherein the spacer insertion mechanism comprises a second housing fixed to the base body through a bracket, the rotating arm is rotatably installed on the bracket and respectively hinged with the slider and the output end of the cylinder body, and the cylinder body is provided in the second housing and the output end of the cylinder body extends out of the second housing.

7. The core detection device of the coring instrument according to claim 6, wherein the slider spans across the base body, two rotating arms are respectively provided at two sides of the base body, and each rotating arm and the slider are respectively provided with a first elongated hole and a second rotating shaft for a hinged connection.

8. The core detection device of the coring instrument according to claim 7, wherein a second guide post is provided between the second housing and the base body, a connecting base is provided at the output end of the cylinder body, the connecting base is slidably connected with the second guide post, and each rotating arm and the connecting base are respectively provided with a second elongated hole and a third rotating shaft for a hinged connection.

9. The core detection device of the coring instrument according to claim 6, wherein the second housing comprises a second end cap, a second shell and a plug which are sequentially connected, the output end of the cylinder body extends out of the second housing through the second end cap, and a second seal corresponding to the second end cap is provided in the second shell.

10. The core detection device of the coring instrument according to claim 2, wherein the core detection device comprises a core pushing rod, a displacement detector and a controller, the controller is electrically connected with the displacement detector and the travel switch respectively, the displacement detector is provided on the core pushing rod, and the controller is configured to calculate a core length according to a displacement data of the core pushing rod obtained by the displacement detector during operation of the travel switch.

11. The core detection device of the coring instrument according to claim 1, wherein the other end of the pull rod is provided with a guide base which is configured to slide in the first housing, the elastic member is a spring provided in the first housing, and the spring is sleeved on the pull rod.

12. The core detection device of the coring instrument according to claim 11, wherein an insulating sleeve is provided on a side of the guide base facing the travel switch, and a copper screw configured to trigger the travel switch is provided on the insulating sleeve.

13. The core detection device of the coring instrument according to claim 12, wherein a pressing sleeve is provided in the first housing, the pressing sleeve is fixedly provided between the guide base and the travel switch and abuts against the insulating sleeve to limit the guide base.

14. The core detection device of the coring instrument according to claim 11, wherein the first housing comprises a first end cap, a first shell and a lower joint which are sequentially connected, the first end cap is provided with the first guide post extending to the base body, a first seal corresponding to the first end cap is sleeved on a portion of the pull rod in the first housing, and the elastic member is provided between the first seal and the guide base.

15. The core detection device of the coring instrument according to claim 1, wherein the base body is provided with an installation cavity in communication with the core channel, and the detection portion is installed in the installation cavity through a first rotating shaft.

16. The core detection device of the coring instrument according to claim 1, wherein the core detection device comprises a core pushing rod, a displacement detector and a controller, the controller is electrically connected with the displacement detector and the travel switch respectively, the displacement detector is provided on the core pushing rod, and the controller is configured to calculate a core length according to a displacement data of the core pushing rod obtained by the displacement detector during operation of the travel switch.

* * * * *